L. H. Plum,

Steam Trap.

No. 102,037. Patented Apr. 19, 1870.

ATTEST.
Jas. H. Layman
J. P. Gosskill

Knight Bros.
attys. for Plum

United States Patent Office.

LOUIS H. PLUM, OF CINCINNATI, OHIO.

Letters Patent No. 102,037, dated April 19, 1870.

---

STEAM-TRAP.

---

The Schedule referred to in these Letters Patent and making part of the same.

---

I, LOUIS H. PLUM, of Cincinnati, Hamilton county, Ohio, have invented a new and usefel Steam Trap, of which the following is a specification.

Nature and objects of the Invention.

This is an improvement in devices for the automatic regulation of heat, and return of the water of condensation in steam-heated pipes or coils, for warming apartments, and comprises an arrangement of parts whereby the water has direct issue through the open end of an imperforate tubular plunger which, by advancing or receding with the expansion or contraction of the main pipe, coacts with a hemispherical seat to open or close the passage; and the parts are so constructed as to secure complete automatic closure of the trap at the maximum steam pressure, and also so that the trap can, at any moment and without removal, be set to any desired maximum heat or pressure, and in conformity with the amount of contraction and expansion of the main pipe in each particular case.

General Description with Reference to the Drawings.

Figure 1:
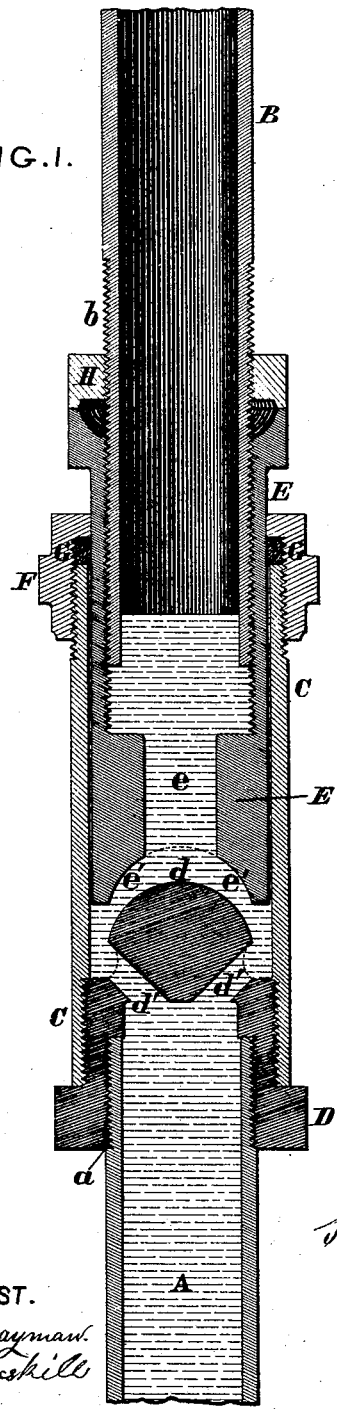
Figure 1 is an axial section, showing a steam trap embodying my invention, in the open condition of said trap.
Figure 2:
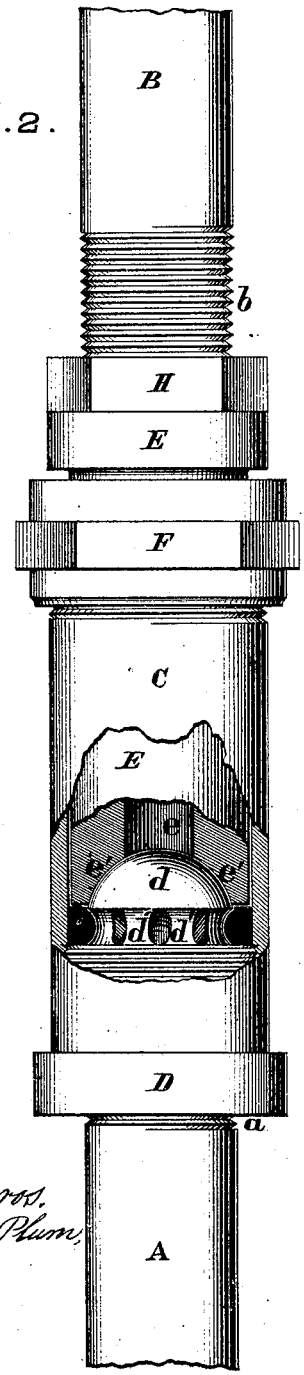
Figure 2 is a side elevation of said trap in its closed condition, a portion of the shell or barrel and of the plunger being broken away.

A and B represent portions of the main pipe at the opposite ends of the trap, and each screw-threaded $a$ $b$ for attachment of the parts composing my sliding joint and trap, namely:

C is a cylindrical shell or barrel, having screwed within its lower end a plug, D, whose crowning hemispherical head $d$ serves as a valve-seat for the open tubular plunger E, and whose obliquely descending apertures $d'$ conduct the water which has descended from the open end of the plunger into the hollow and bottomless interior of the plug, whence it escapes into the pipe A.

The screw-threaded portion $b$ of the pipe B enters the correspondingly screw-threaded upper portion of my open tubular plunger E, whose sole ventage for the water of condensation and inlet for steam consists of the central opening $e$, which discharges into a hemispherical cavity, $e'$, at the bottom of the plunger, which corresponds with and fits the hemispherical head $d$, and in the most expanded condition of the pipe effectually closes the passage by its contact with the said head.

The plunger E fits loosely within the barrel C, and is allowed to slide freely therein while guided to a central position, so as not to touch the sides of the barrel, and, at the same time, so inclosed as to be steam-tight, by the application of a cap or stuffing-box F and grummet G.

The plunger E is secured to any specific adjustment upon the pipe B by means of a jam-nut, H.

The screw-thread $b$ occupies a considerable portion of the length of the pipe B in order to afford sufficient scope for the adjustment of the plunger, as before stated.

Operation.

A vertical portion of the system of pipes, of sufficient length to afford the requisite expansion, having been selected, and the trap introduced therein, the plunger E is, by trial, screwed up or down until its closure takes place at the desired maximum temperature of the pipes, the jam-nut H being then screwed home, the adjustment remains permanent or until changed by releasing the nut H, and screwing the plunger up or down, as the case may require.

The issue of water from the plunger being by a single central passage of large area, and its passage around the seat being vertical, a more free escape is provided for the water than in those arrangements in which the issue is, by lateral orifices, in the plunger or expander; nor is it necessary, as with such, for the plunger to be inclosed tightly in a sleeve, within which it is liable to bind and stick, either with changes of temperature or long disuse.

Nor is my loose plunger, with central issue and closing on a hemispherical seat, liable to fail in closing, as are those having either flat or conical seats, and the large amount of heating surface is an additional guarantee against leakage.

The means of adjustment, being wholly external, can be employed at any time while the apparatus is in operation and without the necessity of removal.

While describing the preferred form of my improvement, I reserve the right to vary the same in non-essential particulars, for example:

The spherical and perforated head $d$, $d'$, instead of being formed on the end of a detachable plug, as in the present illustration, may be a part of the shell or barrel C, which, in that case, would be of cast metal.

Claim.

I claim as my invention—

1. The tubular plunger E, secured to the pipe B with an adjustable steam-tight joint, by means of a prolonged screw-thread and jam-nut H, and operating in combination with the plug or seat D, pipe A, and cylinder C, as set forth.

2. The obliquely-perforated plug D $d$ $d'$, constructed and applied substantially as and for the purposes described.

In testimony of which invention I hereunto set my hand.

LOUIS H. PLUM.

Witnesses:
GEO. H. KNIGHT,
JAMES H. LAYMAN.